C. LINDBOM.
MOWERS.
No. 193,881. Patented Aug. 7, 1877.
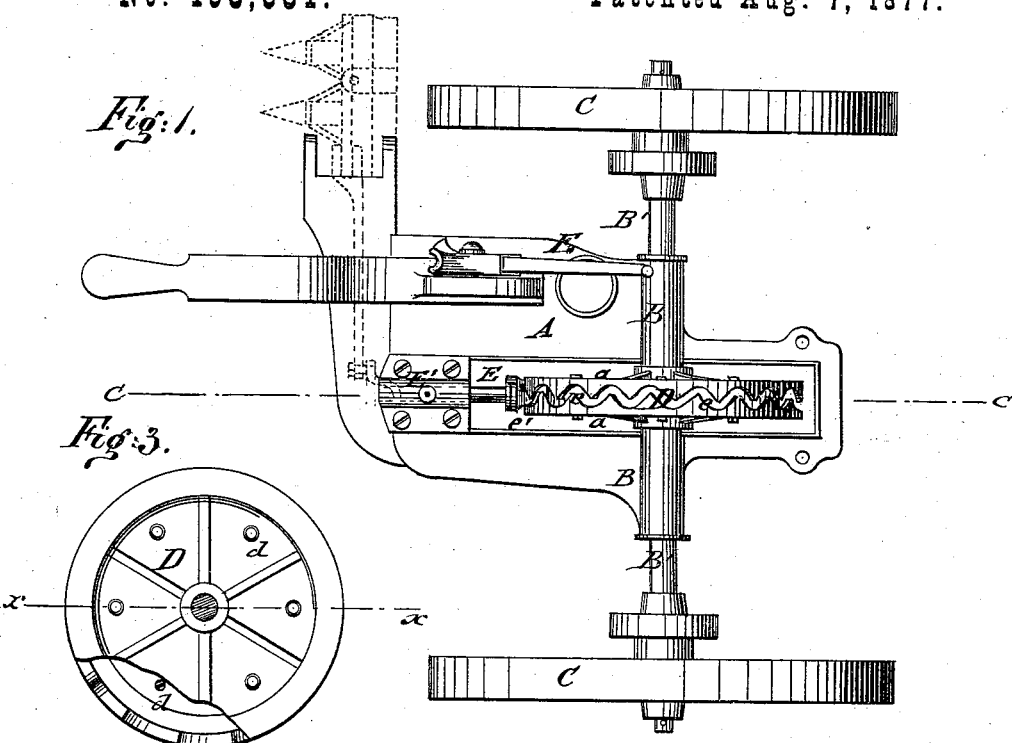
Fig. 1.
Fig. 3.
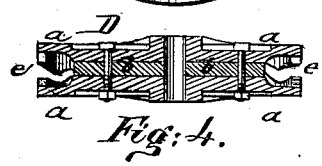
Fig. 4.
Fig. 2.
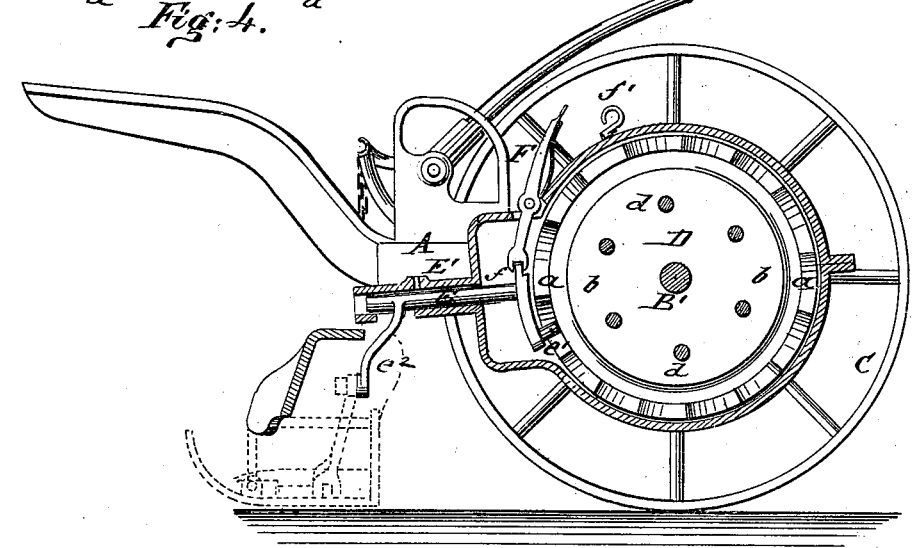
WITNESSES:
Chas. Nida
J. H. Scarborough
INVENTOR:
C. Lindbom
BY 
ATTORNEYS.

UNITED STATES PATENT OFFICE.

CARL LINDBOM, OF STOCKHOLM, SWEDEN.

IMPROVEMENT IN MOWERS.

Specification forming part of Letters Patent No. 193,881, dated August 7, 1877; application filed April 30, 1877.

*To all whom it may concern:*

Be it known that I, CARL LINDBOM, of Stockholm, Sweden, have invented a new and Improved Mowing and Reaping Machine, of which the following is a specification:

In the accompanying drawings, Figure 1 represents a top view of my improved mower and reaper. Fig. 2 is a vertical longitudinal section of the same on line $c\ c$, Fig. 1; and Figs. 3 and 4 are a detail side view and horizontal section on line $x\ x$, Fig. 3, of the actuating wave-wheel.

Similar letters of reference indicate corresponding parts.

The invention consists in simple and effective devices for actuating the cutter-bar of a mower or reaper, as will be hereinafter more fully described, and then pointed out in the claim.

In the drawing, A represents the supporting frame or plate of the mower or reaper, which is hung by a sleeve, B, on the axle B′, supported on the wheels C.

To the axle B′ is keyed the wave-wheel D, which is constructed of two disk-shaped sections, $a$, which are separated by an intermediate wooden disk, $b$, of less diameter, and connected by lateral screw-bolts $d$.

The sections $a\ a$ are provided at the inner circumference with undulating faces having alternating projections and depressions, which run parallel to each other, so that the projections of one section enter the depressions of the other, and form thereby an undulating groove, $e$, in which the crank-pin $e^1$ of a shaft, E, projects.

The shaft E turns in a forward-extending sleeve, E′, of frame A, and has a front crank-arm, $e^2$, that passes through a bottom slot of the sleeve, the crank $e^2$ being again connected by a pivot-link to the cutter-bar, so as to impart reciprocating motion to the same, as the crank-pin $e$ follows the undulating groove of the wave-wheel, and reciprocates thereby the crank-shaft from one side to the other.

The construction of the wave-wheel admits, by the interposition of intermediate disks of varying thicknesses, the adjustment of the distance of the outer disk-sections, which forms a considerable advantage when the same are worn off by long use.

The crank-shaft E is allowed to slide in its sleeve E′, so as to throw the crank-pin $e^1$, by means of a fulcrumed and spring-acted lever, F, in or out of gear, the lever F engaging by its fork-shaped end a lug, $f$, of the crank-shaft.

When it is desired to throw the cutter-bar out of action, the lever F is locked by a pivot-catch, $f'$, which throws the crank-pin out of gear with the groove of the wave-wheel, and discontinues the action of the same on the crank-shaft and cutter-bar.

The reciprocating motion is thus imparted to the cutter-bars of mowers and reapers by a simple, durable, and easily repaired and adjusted mechanism.

Having thus described my invention, I claim as new and desire to secure by Letters Patent—

The combination of the sliding and rocking shaft E, having front and rear crank-arms, crank-pin $e^1$, and lug $f$, the frame having the guide-tube E′, spring-pressed lever F, and catch $f'$, with the wave-wheel D and cutter-bar, all constructed and relatively arranged as herein set forth, for the purpose specified.

CARL LINDBOM.

Witnesses:
 L. A. GROTH,
 EMIL WIDBERG.